United States Patent
Stewart, Jr.

[11] Patent Number: 5,947,013
[45] Date of Patent: Sep. 7, 1999

[54] OUTDOOR GRILL FOR CHARCOAL GRILLING

[76] Inventor: Preston E. Stewart, Jr., 6442 Kennedy Ave., Cincinnati, Ohio 45213

[21] Appl. No.: 09/220,004

[22] Filed: Dec. 23, 1998

[51] Int. Cl.[6] .............................. A47J 37/00; A47J 37/07
[52] U.S. Cl. .................... 99/446; 99/400; 99/447; 99/450; 99/482; 126/25 R; 126/9 R
[58] Field of Search .............................. 99/339, 340, 375, 99/400, 401, 444–446, 447, 450, 481, 482; 126/25 R, 9 R, 41 R, 39 C, 39 R, 39 D, 275 E, 332; 426/523

[56] References Cited

U.S. PATENT DOCUMENTS

| | | | |
|---|---|---|---|
| 3,327,617 | 6/1967 | Harlett | 99/446 X |
| 3,769,901 | 11/1973 | Phillips | 126/25 R |
| 3,967,613 | 7/1976 | Rybak et al. . | |
| 3,989,028 | 11/1976 | Berger . | |
| 4,201,125 | 5/1980 | Ellis | 99/482 X |
| 4,574,770 | 3/1986 | Wells . | |
| 4,727,853 | 3/1988 | Stephen et al. | 126/41 R |
| 4,909,137 | 3/1990 | Brugnoli | 99/444 |
| 5,097,817 | 3/1992 | Dodgen . | |
| 5,121,738 | 6/1992 | Harris . | |
| 5,163,359 | 11/1992 | McLane, Sr. | 99/482 X |
| 5,195,423 | 3/1993 | Beller | 99/340 |
| 5,313,877 | 5/1994 | Holland | 99/450 X |
| 5,347,978 | 9/1994 | Zuran . | |
| 5,473,980 | 12/1995 | Carpenter | 99/446 |
| 5,551,332 | 9/1996 | Beatty | 99/400 X |
| 5,566,606 | 10/1996 | Johnson . | |
| 5,566,607 | 10/1996 | Johnson . | |
| 5,603,256 | 2/1997 | Charlson et al. | 126/25 R |
| 5,718,165 | 2/1998 | Winstead | 99/400 |
| 5,782,166 | 7/1998 | Lin | 99/340 |

*Primary Examiner*—Timothy F. Simone
*Attorney, Agent, or Firm*—Charles R. Wilson

[57] ABSTRACT

An outdoor grill for charcoal grilling is designed to prevent flare-up from fat drippings and to facilitate the disposal of ashes. The grill comprises a portable stand and a horizontally disposed cylindrical-shaped housing on the stand. The housing has a cover door in sidewalls and access holes in flattened end walls. Within the cylindrical housing are a charcoal grate, a cooking rack and a flare-up shield. In one embodiment, an upper small mesh screen is positioned directly on top of the grate. The grate and/or upper small mesh screen are manually shaken to periodically knock ash from charcoal. The flare-up shield has an inverted V-shape and has louvered openings. Heat from the burning charcoal is efficiently transferred to meat on the cooking rack. Any fat drippings are deflected by the flare-up shield towards the housing's sidewalls away from the charcoal.

7 Claims, 4 Drawing Sheets

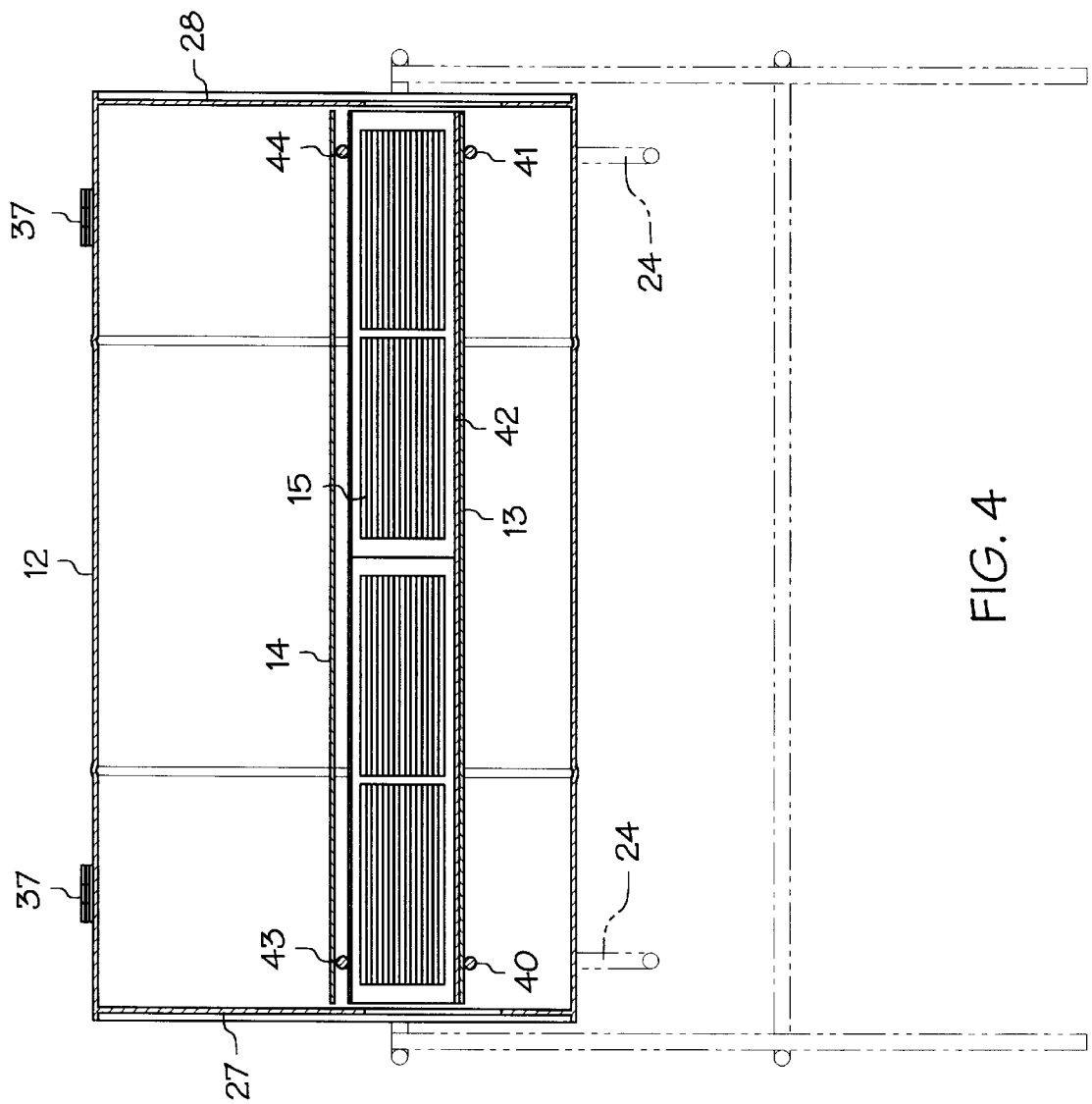

OUTDOOR GRILL FOR CHARCOAL GRILLING

FIELD OF THE INVENTION

This invention relates to an outdoor grill. More particularly, the invention relates to an outdoor grill for charcoal grilling of meats with an efficient transfer of heat and with minimal flare-up from fat drippings.

BACKGROUND OF THE INVENTION

Outdoor grilling of meats is an enjoyable event for many people, whether it be in the individual's own backyard or in a park setting. In recent years, gas-fired grills with a bed of ceramic coals have become popular. They are convenient to use. Any flare-ups from fat drippings onto the ceramic coals is minimal and, if it does occur, is readily controlled simply by reducing the supply of gas to the grill. Clean-up after grilling is also minimal. Normally, only the cooking rack of the grill needs to be cleaned to remove meat or other food residue. Grilling with charcoal, though, is still enjoyed by many people and is highly preferred. Drawbacks associated with the charcoal grilling such as flame flare-ups and charcoal ash disposal are more than offset by enhanced flavor of the food that comes with the charcoal flame and smoke.

Attempts have been made to improve charcoal grills so that the advantages are retained, but the known disadvantages of flame flare-up and ash disposal are alleviated or eliminated. U.S. Pat. Nos. 4,574,770, 5,097,817 and 5,566,607 contain examples of outdoor grills where attempts have been made to catch or divert fat drippings to prevent grease fires, i.e. flare-up. U.S. Pat. Nos. 3,967,613, 3,898,028, 5,121,738, 5,347,978 and 5,566,606 contain descriptions of gas-fired grills with special means to prevent or at least alleviate flame flare-up. They all appear to be effective to a limited degree. However, some of the means used to alleviate or eliminate flare-up appear expensive to manufacture or are particularly adapted to gas-fired grills only. None have addressed the problem of charcoal ash disposal.

In accord with a need experienced by many charcoal grill aficionados, there has not been developed an outdoor grill designed to use charcoal which address the problems of flare-up from fat drippings and charcoal ash disposal. The problems are solved without an exorbitant increase in grill manufacturing cost. At the same time, all the known advantages of conventional charcoal grilling are retained.

SUMMARY OF THE INVENTION

An outdoor grill for charcoal grilling comprises a portable stand, a horizontally disposed cylindrical-shaped housing with flattened end walls, a charcoal grate, a cooking rack and a flare-up shield. The cylindrical-shaped housing has a cover door to access the cooking rack. The housing also has access holes in the flattened end walls to allow air flow, charcoal shaking and charcoal addition as needed. The access holes also facilitate charcoal ash disposal. The housing is positioned on the portable stand. The grate holds the charcoal and can be shaken to remove ash. In one embodiment of the invention, there is further included a movable upper small mesh screen operably associated with the grate. The upper small mesh screen can also be manually moved to shake ashes from the charcoal to enhance heat output from the charcoal. The flare-up shield is positioned on the grate directly below the cooking rack. The shield has an inverted V-shape and louvered openings. The shape deflects fat drippings from cooking meat to sidewalls of the housing away from the charcoal. The louvered openings allow heat from the charcoal to reach the meat. The outdoor grill has minimal flare-ups from the fat drippings and is readily emptied of charcoal ashes through the access holes in the flattened end walls. At the same time, meat is efficiently cooked and/or smoked.

BRIEF DESCRIPTION OF THE DRAWINGS

FIG. 4 is a front sectional view of the outdoor grill of FIG. 3 taken along line 4—4 thereof.

DETAILED DESCRIPTION OF THE INVENTION

The outdoor grill of the invention is described in detail and with particular reference to the drawings. It is useful to the individual who enjoys outdoor charcoal grilling at home for the family. However, the outdoor grill can also be used for group picnics at home or in a park setting. It also can be used in an outdoor commercial setting where the general public congregates. The grill is best suited for grilling meat, including fish. It can, however, be used for grilling other foods such as various vegetables.

Figure 1:
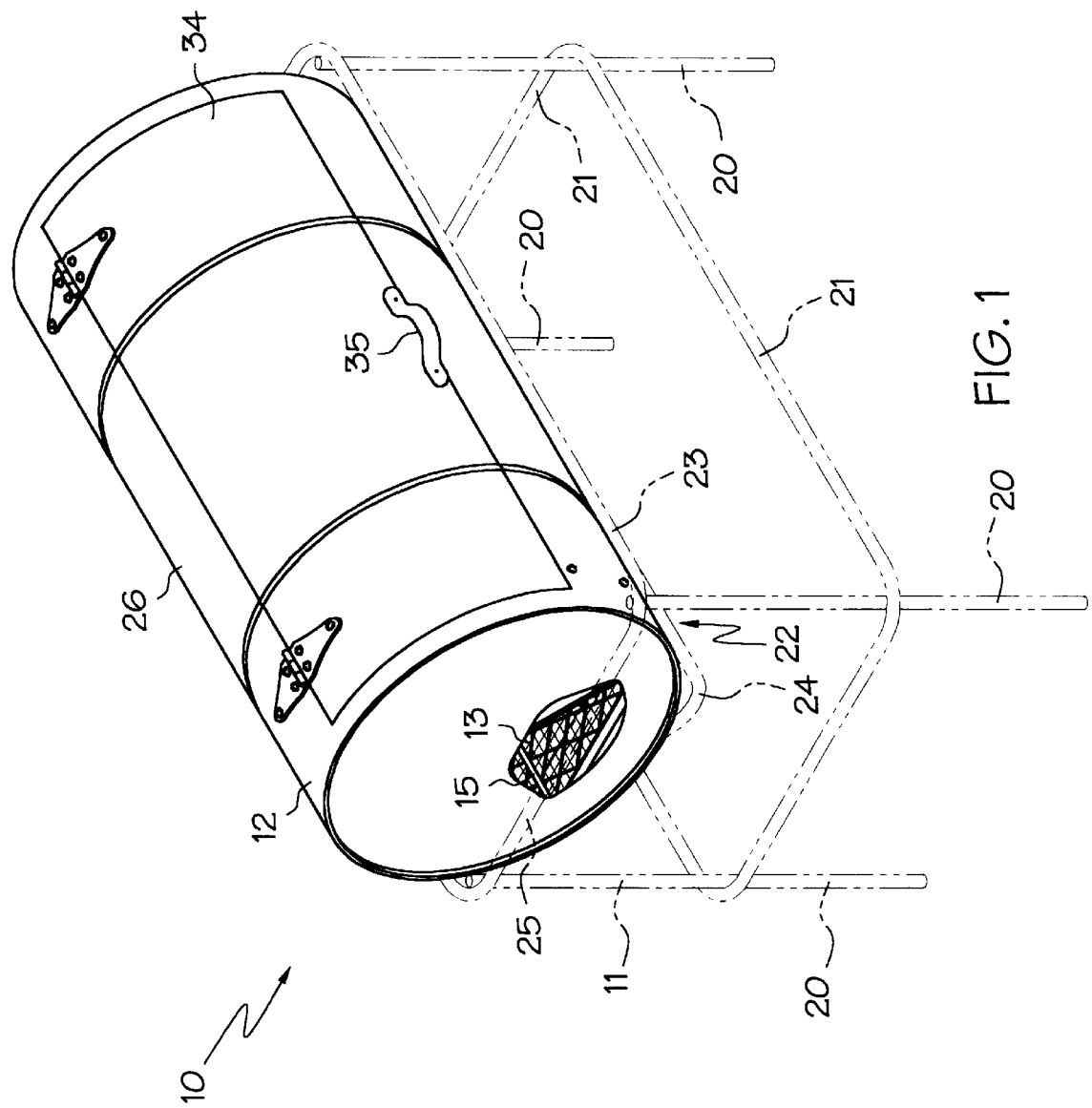
FIG. 1 is a perspective view of the outdoor grill of the invention.
Figure 2:
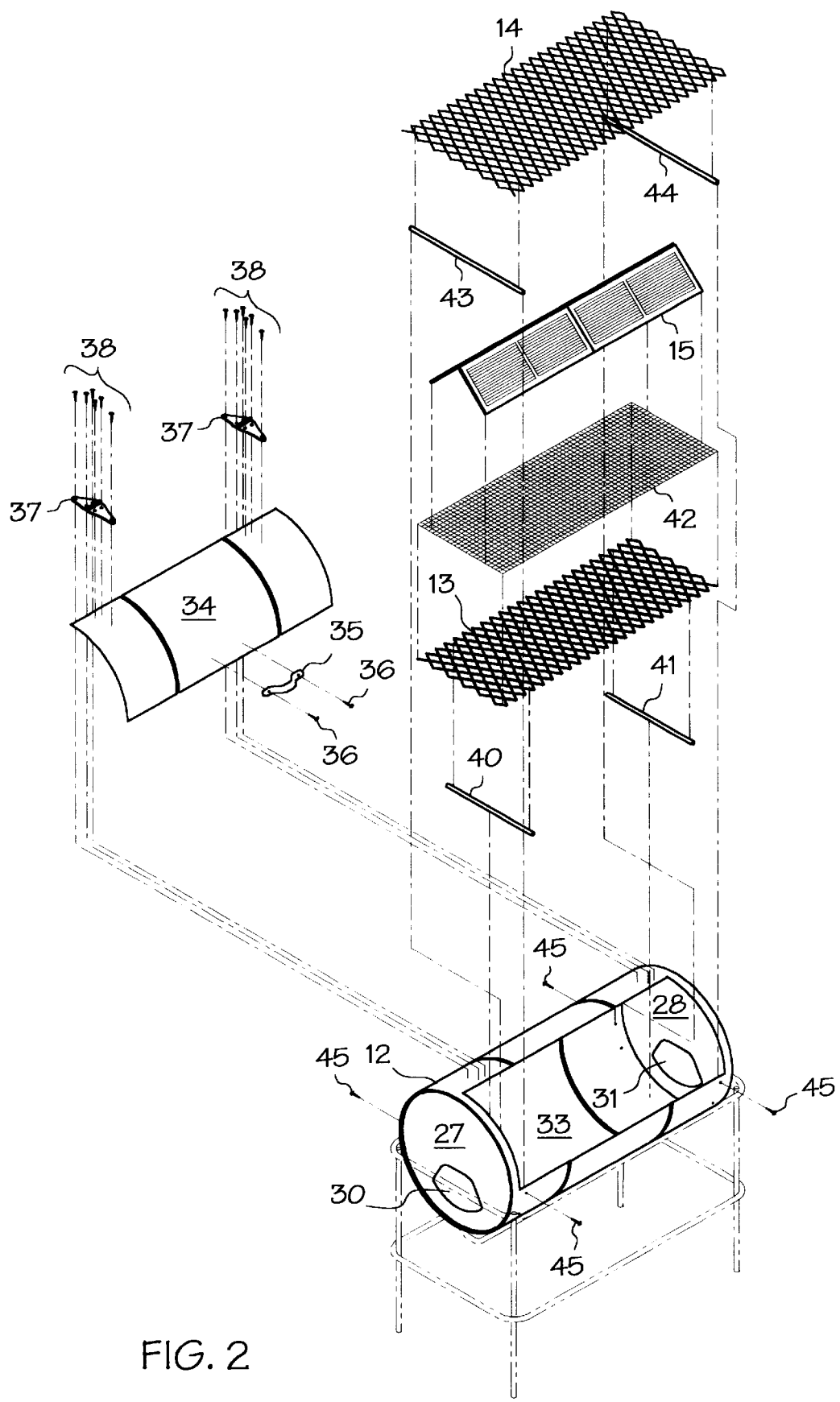
FIG. 2 is an exploded view of the outdoor grill of FIG. 1.

With reference to FIGS. 1 and 2, there is shown the outdoor grill 10 of the invention. The grill comprises as its essential components a portable stand 11, a horizontally disposed cylindrical-shaped housing 12, a charcoal grate 13, a cooking rack 14, and a flare-up shield 15. Each of the components and their interactions are described in the following paragraphs.

The portable stand 11 is constructed to hold the cylindrical-shaped housing 12 off the ground and at approximate waist height for convenience of use. The stand can be any shape or configuration conducive to holding the cylindrical-shaped housing 12. As shown, the portable stand 11 has four legs 20, each about two feet to about three feet in length. Horizontal support bars 21 are permanently secured to the four legs 20 at approximate mid-height to add rigidity to the portable stands. A V-shaped open cradle 22 is permanently secured to tops of the four legs 20. The V-shaped open cradle 22 has two cross bars 23 extending the length of the portable stand and two V-shaped bars 24 extending the width of the portable stand. As readily apparent, the V-shaped cradle 22 is shaped to receive and hold the cylindrical-shaped housing 12. The housing can simply rest in the V-shaped cradle and, because of its weight, will not appreciably move during use. Preferably, a horizontal end bar 25 at each end extends across the width of the stand and is attached to tops of the two legs 20. The horizontal end bars trap the housing within the cradle 22. Alternatively, the housing 12 can be bolted or otherwise secured to the portable stand for enhanced stability if desired.

Portable stands of other shapes or configurations can be used in the invention. For example, the stand can have more legs for greater stability or can be more of a closed solid structure. Optionally, it has wheels for greater mobility.

Still with reference to FIGS. 1 and 2, the housing 12 is cylindrical-shaped with curved sidewalls 26 and substantially flattened end walls 27 and 28. Preferably, the housing has a diameter of from about two feet to about four feet and a length of from about three feet to about six feet. Such dimensions are ideally suited for the primary uses contemplated. It should be understood that housings of smaller or larger dimensions are feasible and may serve more niche markets.

As best seen in FIG. 2, the cylindrical-shaped housing 12 has a first access hole 30 in one substantially flattened end wall 27 and a second access hole 31 in the other substantially flattened end wall 28. Each hole is depicted as having a truncated pie-shape. Other shaped holes are feasible. The holes allow the free flow of air. Importantly, each hole is positioned in a lower portion of its end wall so as to gain access to the grate 13 within the housing and also to facilitate ash removal from the housing as further described below.

With particular reference to FIGS. 1 and 2, the cylindrical-shaped housing 12 also has a large opening 33 in its sidewall 26 and a cover door 34 operably associated with the opening 33 in the sidewall 26. The cover door 34 has a handle 35 for ease of opening and closing. As evident in FIG. 2, a set of screws 36 permanently hold the handle 35 to the cover door 34. The door is simply to gain access to the housing's interior to add and position meat on the cooking rack within the housing, and remove cooked meat. The door can be left open during charcoal grilling or can be closed to increase cooking time and/or better smoke the meat. As shown, two hinges 37 attached to the cover door 34 by screws 38 near the door's lateral edges and attached to the housing's sidewall 26 allow the cover door 34 to swing about 180 degrees from a fully closed position to a fully open position. Other means for hingeably attaching the cover door 34 to the housing 12 can be used.

Figure 3:
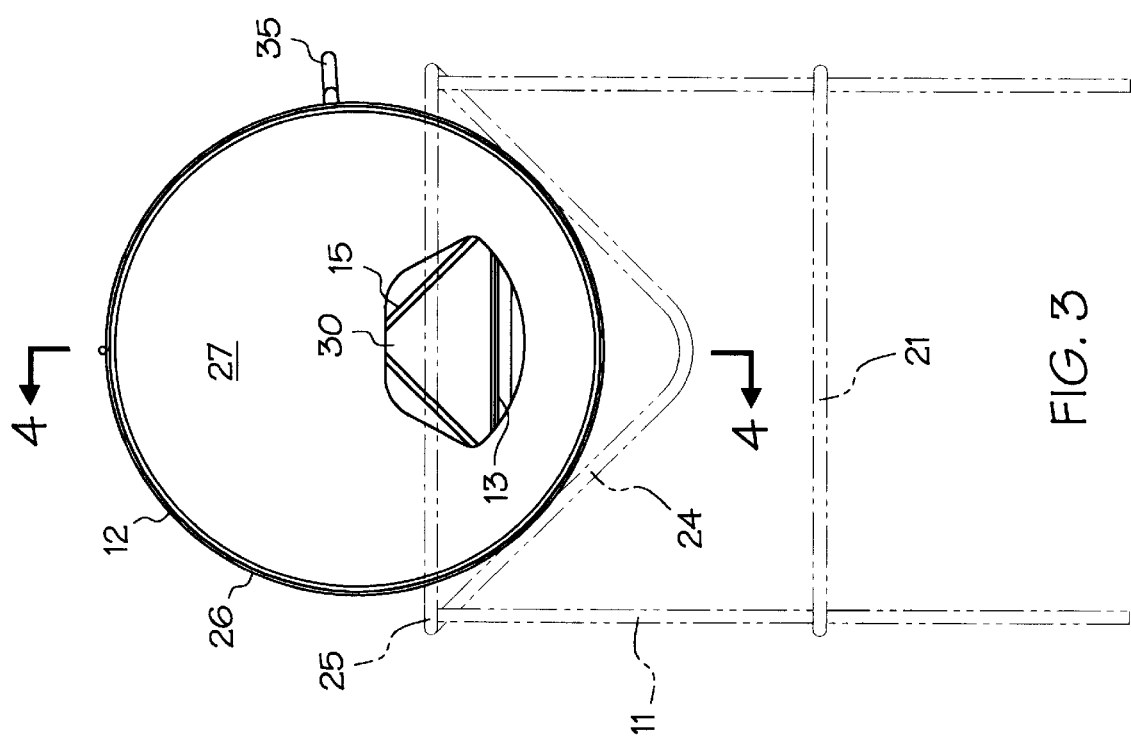
FIG. 3 is an end elevational view of the outdoor grill of FIG. 1.

The grate 13 of the outdoor grill 10 is dimensioned to be horizontally disposed within the cylindrical-shaped housing 12 and substantially extend from one flattened end wall to the other flattened end wall and also from one sidewall to an opposed sidewall. As best seen in FIG. 3, the grate 13 is positioned in a lower portion of the housing 12 at the same vertical level as the access holes 30 and 31. It is designed to hold the charcoal and the flare-up shield 15. The grate 13 also is designed to knock ashes off burning charcoal and allow them to drop to the bottom of the housing. The ash removal allows the charcoal to burn hotter and also enhances heat transfer to the meat being cooked.

As best seen in FIG. 2, the grate 13 has a criss-cross network of bars or flattened metal work which create a series of openings. Spacing of the bars or flattened metal work is adjusted to create openings small enough to retain charcoal both in a full size unburned state and a substantially reduced size burned state. The openings are necessarily large enough to allow fine sized ash to readily drop through to the cylindrical-shaped housing's bottom wall.

A set of horizontally disposed support rods 40 and 41 are provided to hold the grate 13 in place. Preferably, the support rods 40 and 41 are flattened so as to have a taper downwardly and inwardly at their terminuses. They further have a length to engage sidewalls of the cylindrical-shaped housing 12 and remain in place. Once the support rods are positioned in the housing, a downward force from the grate and added charcoal sturdily holds the grate and support rods in place during use. At the same time, the lack of mechanical attachments for the support rods and grate facilitates their assembly for use and disassembly for cleaning purposes. Alternatively, the horizontal support rods 40 and 41 can be mechanically attached to sidewalls of the housing 13, for example by screws for greater stability. However, for the reasons advanced, the absence of a mechanical attachments is preferred.

In one embodiment of the invention and still with reference to FIG. 2, an upper small mesh screen 42 is positioned directly over the grate 13. The upper small mesh screen 42 is movable relative to the grate 13. The upper mesh screen 42 simply lays on top of the grate 13. Openings in the upper screen 42 are smaller than openings in the grate 13. The upper screen's length is about one inch to about four inches less than the length of the grate. This allows sufficient distance that an end of the upper screen can be manually grasped and moved longitudinally back and forth to shake loose ash from the burning charcoal. The relatively small mesh size allows the ash to drop through the openings and necessarily also through the larger mesh openings in the grate to the bottom of the housing 12.

The cooking rack 14 is engaged to sidewalls of the cylindrical-shaped housing 12 above the grate 13. It forms a substantially flat surface to hold the meat to receive heat from the underlying charcoal. The rack 14 is conventional. It has a series of wire rods secured together and extending laterally, longitudinally and/or diagonally to create openings. A support surface is created to hold the meat with the openings allowing fat drippings to drop downwardly as they are formed. The rack can be permanently secured to the housing. More preferably, two horizontal support rods 43 and 44 are secured to sidewalls of the housing 12 by screws 45. The rods extend across the housing and the cooking rack rests on top of them. Alternatively, a set of flanges are secured to the housing's sidewall, all at substantially the same height. The rack 14 rests on the flanges during use. This allows the rack to be readily lifted and removed from the outdoor grill 10 for cleaning purposes.

The flare-up shield 15 is positioned over the grate 13. It has an inverted V-shape in transverse cross section and has louvered openings. The shield 15 can have a length and width which approximates the length and width of the cylindrical-shaped housing. The shield can as well be a series of smaller inverted V-shaped structures which sit side-by-side along the length of the housing. As best seen in FIG. 4, the flare-up shield 15 has two parts sitting side-by-side. The shape of the shield directs any fat drippings to the sidewalls of housing away from the underlying burning charcoal. The louvered openings allow heated air to flow to the overlying meat while preventing the fat drippings to drop directly downwardly onto the burning charcoal.

In use, charcoal is added to the outdoor grill of the invention through the access holes in the grill's flattened sidewalls. The charcoal rests on the charcoal grate. When it is ignited and hot, meat or other foods are placed on top of the cooking rack. The cover door can be left open or closed. Periodically, during the cooking process, the grate or in certain instances upper small mesh screen on top of the grate is manually moved back and forth to loosen ash from the charcoal. Meats that have a high fat content such as hamburgers or beef steaks can be cooked using a very hot heat source without a concern for flame flare-up and meat charring. More charcoal can be added as needed through the access holes in the flattened end walls of the grill's housing. As such, the cooking rack and the meat on it do not have to be disturbed. That is, the cooking process is not interrupted by the need to augment the original charcoal as it is consumed. Once the cooking is completed and the charcoal fire extinguished or died out, the outdoor grill can be tipped to one side so that ashes fall out an access hole in the flattened end wall.

An important benefit of the outdoor grill of the invention is the ability to control the temperature within the grill's housing. Preferably, an oven thermometer is placed on the front edge of the grate half way between the flattened end walls of the grill, just behind the cover door. The thermometer makes it possible to determine the amount of heat being applied to the meat during the cooking time. The amount of heat is controlled and regulated by the amount of charcoal that is placed in the grill during cooking. It is recommended that one layer of charcoal be placed from end to end and side to side on the grate so as to produce heat to approximately 400 degrees. If this is the temperature desired for the item being cooked, this temperature can be maintained by cooling the charcoal with water if too high, or adding more charcoal if too low. The determination of the heat required and the cooking time for an item or items being cooked, can be made from any standard cookbook. Once this is determined, and as the amount of time that an item or each of the items is reached, they are removed. This enables the cooking of more than one item simultaneously, i.e. turkey, prime rib, and a whole salmon. It is not recommended at any time to cover or partially cover, the access holes on the sidewalls as a means of control of heat or burning rate of the charcoal. The heat temperature should be controlled as indicated previously. Some consideration should be given, when determining and maintaining heat control, to the environmental temperature of the time of cooking such as summer or winter. Consideration of the direction of the wind on a very windy day should be noted and the grill should not be turned in a manner that the wind blows directly through the access holes in the sidewalls. This may cause difficulty in maintaining a constant temperature within the grill. The cover door can be opened just enough to see the thermometer for observation of the temperature during the cooking process. This alleviates opening the cover door completely, thus maintaining maximum heat in the cooking chamber.

Having described the invention in its preferred embodiment, it should be clear that modifications can be made without departing from the spirit of the invention. It is not intended that the words used to describe the invention nor the drawings illustrating the same be limiting on the invention. It is intended that the invention only be limited by the scope of the appended claims.

I claim:

1. An outdoor grill for charcoal grilling of meats with an efficient transfer of heat to the meat and with minimal flare-up from fat drippings, comprising:

(a) a portable stand;

(b) a horizontally disposed cylindrical-shaped housing securely positioned on the portable stand, said housing having sidewalls and flatten end walls with an access hole in each end wall to allow air flow and to access the charcoal within the housing and further having a cover door on the sidewall to create a closed housing when said door is in a closed position for cooking or smoking the meat when grilling and when in an open position to access the meat;

(c) a charcoal grate to hold the charcoal, said grate positioned in the cylindrical-shaped housing and accessible through each access hole in the housing for periodic manual shaking to remove ashes from the charcoal to enhance heat output from the charcoal;

(d) a cooking rack engaged to sidewalls of the housing above the screen system to form a substantially flat surface to hold the meat to receive heat from the charcoal; and (e) a flare-up shield positioned on the charcoal grate directly below the cooking rack, said flare-up shield having an inverted V-shape to deflect fat drippings from the meat as it cooks to sidewalls of the housing away from the charcoal and further having louvered openings to allow heat from the charcoal to reach the meat on the cooking rack, whereby meat on the cooking rack is smoked or cooked as desired with an efficient transfer of heat from charcoal and any fat drippings from the meat are diverted away from the charcoal to alleviate flare-up and charring of the meat.

2. The outdoor grill of claim 1 further wherein a first set of removable horizontal support rods are positioned in the cylindrical-shaped housing and the charcoal grate positioned thereon.

3. The outdoor grill of claim 2 further having a second set of horizontal support rods to hold the cooking rack, wherein said second set of horizontal support rods are secured to sidewalls of the cylindrical-shaped housing at a position above the first set of horizontal support rods.

4. The outdoor grill of claim 1 wherein the portable stand has a set of legs and an open cradle attached thereto to receive and securely hold the cylindrical-shaped housing.

5. The outdoor grill of claim 2 further comprising an upper small mesh screen laying directly on top of the charcoal grate, said screen for periodic manual shaking to remove ash from the charcoal.

6. The outdoor grill of claim 1 wherein the flare-up shield extends substantially the length and width of the cylindrical-shaped housing.

7. An outdoor grill for charcoal grilling of meats with an efficient transfer of heat to the meat and with minimal flare-up from fat drippings, comprising:

(a) a portable stand;

(b) a horizontally disposed cylindrical-shaped housing securely positioned on the portable stand, said housing having sidewalls and flatten end walls with an access hole in each end wall to allow air flow and to access the charcoal within the housing and further having a cover door on the sidewall to create a closed housing when said door is in a closed position for cooking or smoking the meat when grilling and when in an open position to access the meat;

(c) a charcoal grate to hold the charcoal, said grate positioned in the housing at a vertical level so as to be accessible through the access holes in the flattened end walls of the cylindrical-shaped housing;

(d) an upper movable small mesh screen operably associated with the charcoal grate for periodic manual shaking to remove ashes from the charcoal to enhance heat output from the charcoal;

(e) a cooking rack engaged to sidewalls of the housing above the charcoal grate to form a substantially flat surface to hold the meat to receive heat from the charcoal; and (f) a flare-up shield positioned on the upper movable small mesh screen directly below the cooking rack, said flare-up shield having an inverted V-shape to deflect fat drippings from the meat as it cooks to sidewalls of the housing away from the charcoal and further having louvered openings to allow heat from the charcoal to reach the meat on the cooking rack, whereby meat on the cooking rack is smoked or cooked as desired with an efficient transfer of heat from charcoal and any fat drippings from the meat are diverted away from the charcoal to alleviate flare-up and charring of the meat.

* * * * *